United States Patent [19]
Weber et al.

[11] Patent Number: 5,795,157
[45] Date of Patent: Aug. 18, 1998

[54] MEDICAL TEACHING AID

[76] Inventors: Alice H. Weber, 1904 Mount Vernon Blvd., Toledo, Ohio 43607; Katherine L. Miller, P.O. Box 267, Cambridge City, Ind. 47327

[21] Appl. No.: 881,447

[22] Filed: Jun. 24, 1997

Related U.S. Application Data

[60] Provisional application No. 60/020,359 Jun. 24, 1996.

[51] Int. Cl.⁶ ............................................. G09B 23/30
[52] U.S. Cl. ........................................ 434/269; 434/272
[58] Field of Search ................................. 434/262, 267, 434/269, 272

[56] References Cited

U.S. PATENT DOCUMENTS

| | | | |
|---|---|---|---|
| 340,270 | 4/1886 | Yaggy | 434/269 |
| 396,381 | 1/1889 | Yaggy | 434/269 |
| 5,112,228 | 5/1992 | Zouras | 434/272 |
| 5,356,295 | 10/1994 | Grosz | 434/267 |
| 5,411,437 | 5/1995 | Weber et al. | 434/269 |
| 5,518,406 | 5/1996 | Waters | 434/267 |

FOREIGN PATENT DOCUMENTS 16916  1/1887  United Kingdom .............. 434/269

*Primary Examiner*—John A. Ricci
*Attorney, Agent, or Firm*—Donald R. Fraser

[57] ABSTRACT

A medical teaching aid comprises a primary overlay representing a portion of the human body, a fastener for releasably securing the primary overlay to a supporting structure, indicia on the primary overlay depicting human anatomical features, a secondary overlay formed of a transparent sheet material including tubes affixed thereto which cooperate graphically with the indicia on the primary overlay when the secondary overlay is superposed over the primary overlay, and a fastener for releasably securing the secondary overlay to the primary overlay.

15 Claims, 1 Drawing Sheet

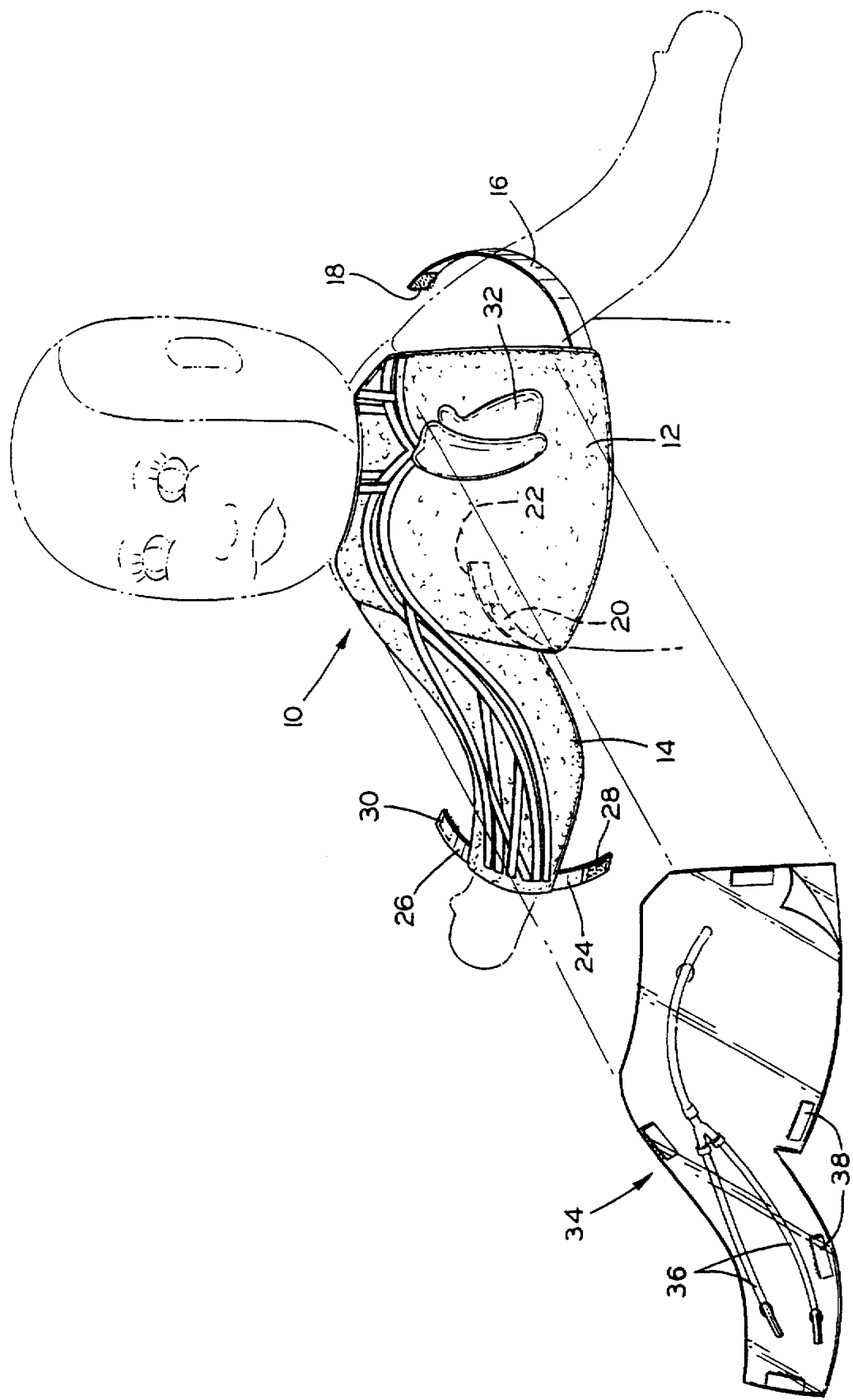

MEDICAL TEACHING AID

This application is filed under the provisions of 35 USC Section 111(a), and claims the benefits of a provisional patent application Ser. No. 60/020,359 filed Jun. 24, 1996 under the provisions of 35 USC Section 111(b).

FIELD OF THE INVENTION

This invention relates generally to a medical teaching aid. More particularly, the invention is directed to a teaching aid for instructing medical and health care professionals and lay persons regarding the correct use, including the subcutaneous insertion, of medical devices such as PICC lines, catheters, injection syringes, and the like.

BACKGROUND OF THE INVENTION

Medical and health care professionals prefer to teach the use, including the subcutaneous insertion, of medical devices utilizing teaching aids to facilitate the communication of complex medical issues, in a manner designed to provide the necessary knowledge and information to other professionals as well as to patients and the families of patients. There is a need for culturally sensitive and graphically intense methods and devices for teaching and illustrating the proper use and insertion of subcutaneous medical devices. Such methods and devices should encourage interactive participation between the medical professional and patient, should provide for the assessment of patient and family comprehension of the procedure discussed, and should be useful for the promotion of appropriate self- and family-management of the subject medical devices, to facilitate proper care, techniques, and resultant well-being.

SUMMARY OF THE INVENTION

Accordant with the present invention, a medical teaching aid for instructing the proper use, including the subcutaneous insertion, of medical devices surprisingly has been discovered. The medical teaching aid comprises a primary overlay, representing a portion of the human body; means for releasably securing the primary overlay to a supporting structure; indicia on the primary overlay depicting human anatomical features; a secondary overlay formed of a transparent sheet material, said secondary overlay including one or more tubes affixed thereto, said tubes cooperating graphically with the indicia on the primary overlay when said secondary overlay is superposed over the primary overlay; and means for releasably securing the secondary overlay to the primary overlay.

The medical teaching aid according to the present invention is particularly useful for teaching the correct use, and methods for the subcutaneous insertion, of medical devices such as PICC lines, catheters, injection syringes, and the like.

BRIEF DESCRIPTION OF THE DRAWING

The novel features that are considered characteristic of the invention are set forth with particularity in the appended claims. The invention itself, however, will best be understood from the accompanying description of specific embodiments, when read in conjunction with the attendant drawing, in which the FIGURE is a perspective view of a medical teaching aid, including a primary overlay and a transparent secondary overlay, according to the present invention.

DETAILED DESCRIPTION OF THE PREFERRED EMBODIMENT

The present invention is directed to a teaching aid, comprising a primary overlay representing a portion of the human body, means for releasably securing the primary overlay to a supporting structure, indicia on the primary overlay depicting human anatomical features, a secondary overlay formed of a transparent sheet material including tubes affixed thereto which cooperate graphically with the indicia on the primary overlay when the secondary overlay is superposed over the primary overlay, and means for releasably securing the secondary overlay to the primary overlay.

Referring now to the FIGURE, there is shown at 10 a primary overlay, according to the present invention. The primary overlay 10 is formed of a sheet material such as, for example, a polyester, nylon, rayon, or latex fabric which, in the illustrated embodiment, is shaped like a portion of the human torso 12 and an associated one arm 14, thereby representing a portion of the human body. The sheet material of the primary overlay 10 is supple and may be conformed to the surface of a human body or a teaching doll.

The torso 12 of the primary overlay 10 may be releasably secured to the supporting structure by a strap 16 having a fabric receiving pad 18 affixed to the end thereof. The fabric receiving pad 18 may be made of, for example, VELCRO (™), and is adapted to connect with a similar strap 20 and associated pad 22. In operation, the straps 16 and 20 are placed around the posterior of the torso of the human body or teaching doll, to position the torso 12 of the primary overlay 10 generally in registry with the torso of the human body or teaching doll.

In a similar fashion the arm 14 portion of the primary overlay 10 may be positioned in registry with the extended arm of the human body or teaching doll, and may be releasably secured by means of oppositely extending straps 24 and 26 provided with cooperating connecting pads 28 and 30, respectively.

It will be readily apparent to those ordinarily skilled in the art that any conventional method may be used to releasably secure the primary overlay 10 to the supporting structure.

Indicia 32 depicting human anatomical features and prepared from, for example, a fabric selected from those listed above is affixed on the primary overlay 10, such as for example by stitching. The indicia 32 in the illustrated embodiment depicts a human heart and its associated major veins and arteries. As can be appreciated by one ordinarily skilled in the art, it is helpful from a teaching standpoint to color-code the applied indicia; e.g., blue for arteries, red for veins, etc. It will be understood that the primary overlay 10 may have indica 32 thereon other than the heart and associated veins and arteries illustrated in the FIGURE.

A secondary overlay 34, made of a conventional transparent sheet material such as, for example, polyethylene, polypropylene, a vinyl polymer, etc., is adapted to be superposed over the primary overlay 10. The secondary overlay 34 includes one or more tubes 36 which are affixed thereto by any conventional means such as, for example, by frictional engagement between two layers of the secondary overlay 34 transparent sheet material, as illustrated in the FIGURE. It must be noted that any conventional method may be used to affix the tubes 36 to the secondary overlay 34. The tubes 36 may be made from any conventional plastic material such as, for example, polypropylene, polyethylene, a vinyl polymer, latex, or the like.

The tubes 36 of the secondary overlay 34 are positioned to cooperate graphically with the indicia 32 of the primary overlay 20, when the secondary overlay 34 is superposed over the primary overlay 10. These tubes 36 are typically used to demonstrate the correct medical procedures related to the insertion and withdrawal of medical devices. In the illustrated embodiment, the tubes 36 are designed to simulate the blood vessels of a torso and arm. In other embodiments of the present invention (not shown), tubes could be used to simulate nerves, muscle fibers, and other baculiform anatomical features within the human body.

In the illustrated embodiment, the secondary overlay 34 includes secondary fabric receiving pads 38 which may be made of, for example, VELCRO(™). The secondary fabric receiving pads 38 are positioned at various locations on the secondary overlay 34 so that, when the secondary overlay 34 is superposed over and contacted to the primary overlay 10, the secondary overlay 34 becomes releasably secured to the primary overlay 10 by virtue of the secondary fabric receiving pads 38 contacting and adhering to the primary overlay 10 sheet material. Useful primary overlay 10 sheet materials which conveniently adhere to fabric receiving pads include, for example, polyester, nylon, rayon, and latex fabrics. It will be readily apparent to one ordinarily skilled in the art that other conventional methods and devices may be used to releasably secure the secondary overlay 34 to the primary overlay 10.

The invention is more easily comprehended by reference to the specific embodiments recited hereinabove which are representative of the invention. It must be understood, however, that these specific embodiments are provided only for the purpose of illustration, and that the invention may be practiced otherwise than as specifically illustrated without departing from its spirit and scope.

What is claimed is:

1. A medical teaching aid, comprising:
   a primary overlay, representing a portion of the human body;
   means for releasably securing the primary overlay to a supporting structure;
   indicia on the primary overlay depicting human anatomical features;
   a secondary overlay formed of a transparent sheet material, said secondary overlay including one or more tubes affixed thereto, said tubes cooperating graphically with the indicia on the primary overlay when said secondary overlay is superposed over the primary overlay; and
   means for releasably securing the secondary overlay to the primary overlay.

2. The medical teaching aid according to claim 1, wherein the primary overlay is made from polyester, nylon, rayon, or latex fabric.

3. The medical teaching aid according to claim 1, wherein the means for releasably securing the primary overlay to a supporting structure comprises a strap including a fabric receiving pad.

4. The medical teaching aid according to claim 1, wherein the indicia is made from polyester, nylon, rayon, or latex fabric.

5. The medical teaching aid according to claim 1, wherein the indicia depicts a human heart and its associated major veins and arteries.

6. The medical teaching aid according to claim 1, wherein the indicia is color-coded.

7. The medical teaching aid according to claim 1, wherein the secondary overlay is made from polyethylene, polypropylene, or a vinyl polymer.

8. The medical teaching aid according to claim 1, wherein the tubes are made from polyethylene, polypropylene, a vinyl polymer, or latex.

9. The medical teaching aid according to claim 1, wherein the tubes are affixed to the secondary overlay by frictional engagement between two layers of the secondary overlay.

10. The medical teaching aid according to claim 1, wherein the means for releasably securing the secondary overlay to the primary overlay comprises secondary fabric receiving pads affixed to the secondary overlay.

11. A medical teaching aid, comprising:
    a primary overlay made from polyester, nylon, rayon, or latex fabric, said primary overlay representing a portion of the human body;
    means for releasably securing the primary overlay to a supporting structure, comprising a strap including a fabric receiving pad;
    indicia on the primary overlay, said indicia made from polyester, nylon, rayon, or latex fabric, said indicia depicting human anatomical features;
    a secondary overlay formed of polyethylene, polypropylene, or a vinyl polymer, said secondary overlay including one or more tubes made from polyethylene, polypropylene, a vinyl polymer, or latex affixed thereto, said tubes cooperating graphically with the indicia on the primary overlay when said secondary overlay is superposed over the primary overlay; and
    means for releasably securing the secondary overlay to the primary overlay, comprising secondary fabric receiving pads affixed to the secondary overlay.

12. The medical teaching aid according to claim 11, wherein the indicia depicts a human heart and its associated major veins and arteries.

13. The medical teaching aid according to claim 11, wherein the indicia is color-coded.

14. The medical teaching aid according to claim 11, wherein the tubes are affixed to the secondary overlay by frictional engagement between two layers of the secondary overlay.

15. A medical teaching aid, comprising:
    a primary overlay made from polyester, nylon, rayon, or latex fabric, said primary overlay representing a portion of the human body;
    means for releasably securing the primary overlay to a supporting structure, comprising a strap including a fabric receiving pad;
    indicia on the primary overlay, said indicia made from polyester, nylon, rayon, or latex fabric, said indicia being color-coded and depicting a human heart and its associated major veins and arteries;
    a secondary overlay formed of polyethylene, polypropylene, or a vinyl polymer, said secondary overlay including one or more tubes made from polyethylene, polypropylene, a vinyl polymer, or latex affixed thereto by frictional engagement between two layers of the secondary overlay, said tubes cooperating graphically with the indicia on the primary overlay when said secondary overlay is superposed over the primary overlay; and
    means for releasably securing the secondary overlay to the primary overlay, comprising secondary fabric receiving pads affixed to the secondary overlay.

* * * * *